April 28, 1964 C. D. DE LOSSY ETAL 3,130,717
ELECTRICAL APPARATUS FOR THROWING FLYING TARGETS
USED IN SHOOTING TRAINING AND MATCHES
Filed March 2, 1961 5 Sheets-Sheet 1
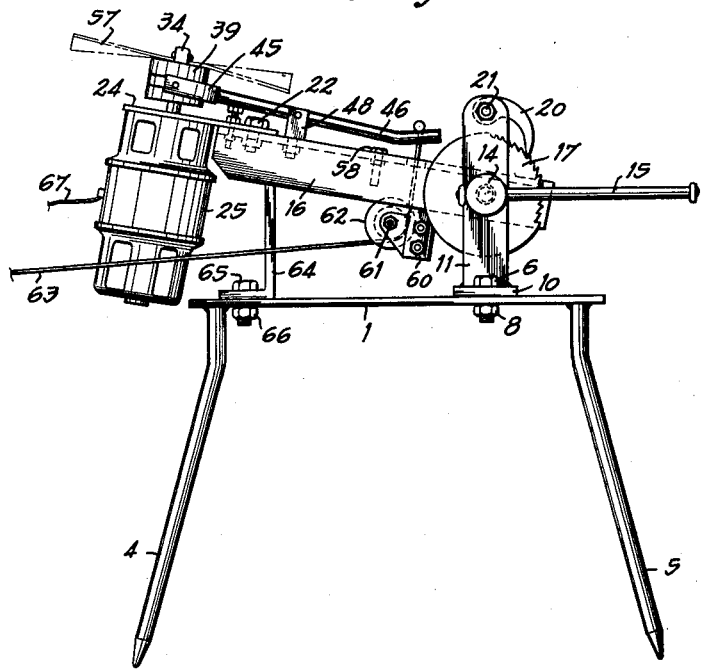
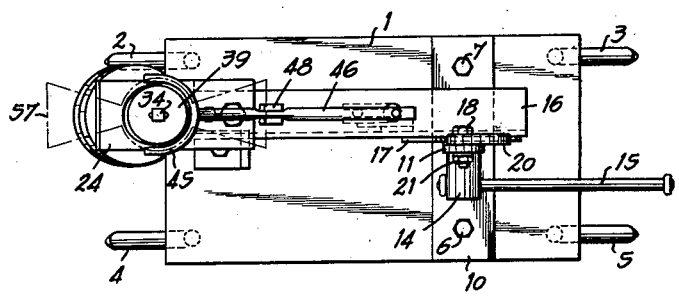
INVENTORS
C. D. de Lossy
BY H. Moïniz
P. Moïniz
Watson, Cole, Grindle & Watson
Attys.

April 28, 1964 C. D. DE LOSSY ETAL 3,130,717
ELECTRICAL APPARATUS FOR THROWING FLYING TARGETS
USED IN SHOOTING TRAINING AND MATCHES
Filed March 2, 1961 5 Sheets-Sheet 2
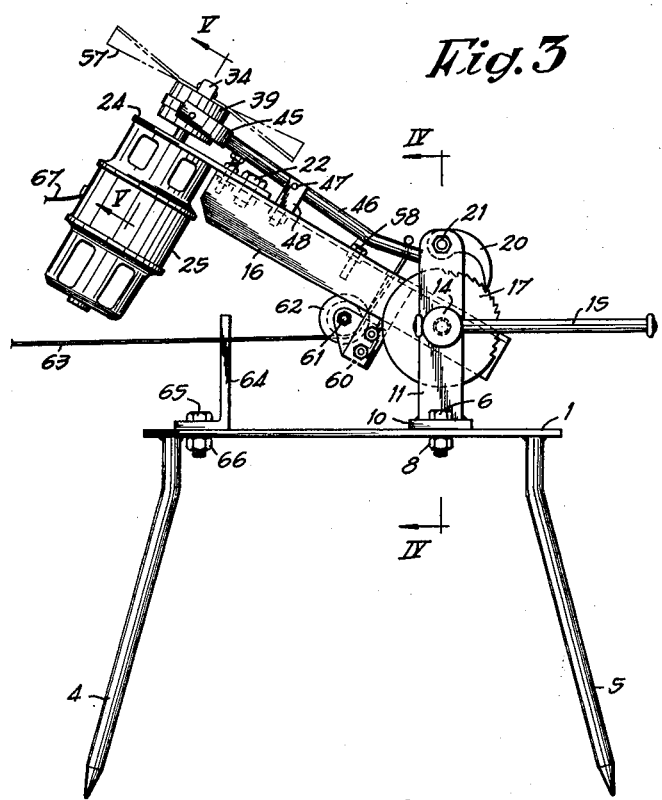
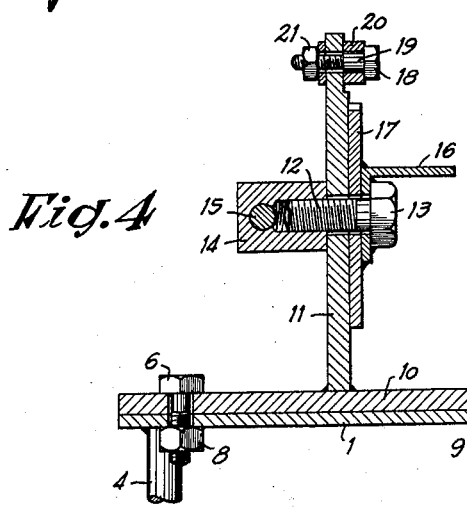
INVENTORS
C. D. de Lossy
H. Moinil
F. Moinil
BY
Watson, Cole, Grindle & Watson
Attys.

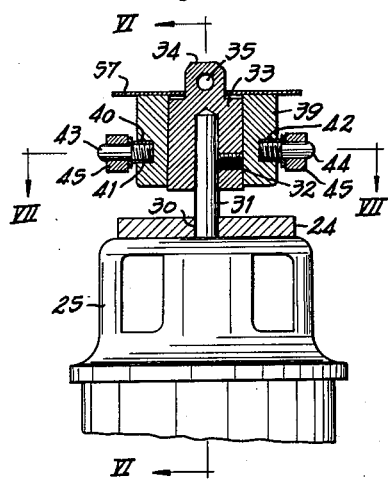
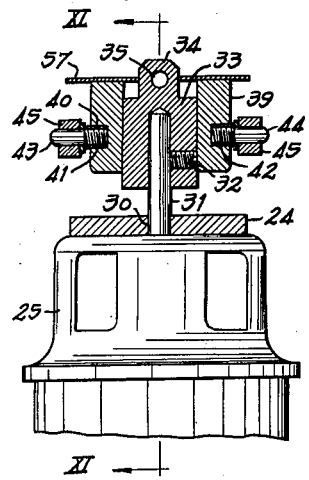
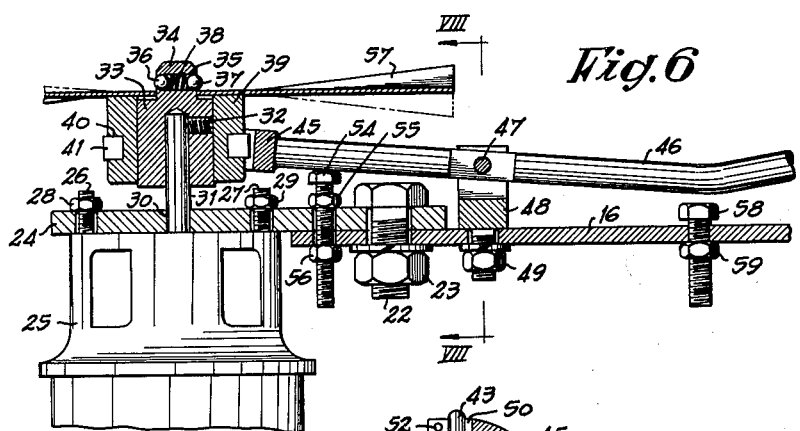
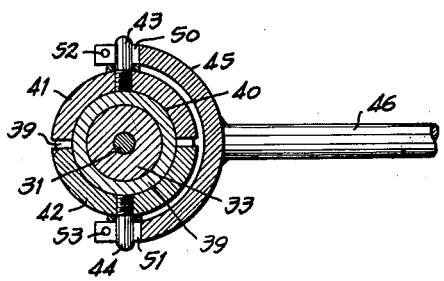

April 28, 1964    C. D. DE LOSSY ETAL    3,130,717
ELECTRICAL APPARATUS FOR THROWING FLYING TARGETS
USED IN SHOOTING TRAINING AND MATCHES
Filed March 2, 1961    5 Sheets-Sheet 4

INVENTORS
C. D. de Lossy
BY H. Moinil
F. Moinil
Watson, Cole, Grindle & Watson
Attys.

April 28, 1964   C. D. DE LOSSY ETAL   3,130,717
ELECTRICAL APPARATUS FOR THROWING FLYING TARGETS
USED IN SHOOTING TRAINING AND MATCHES
Filed March 2, 1961   5 Sheets-Sheet 5
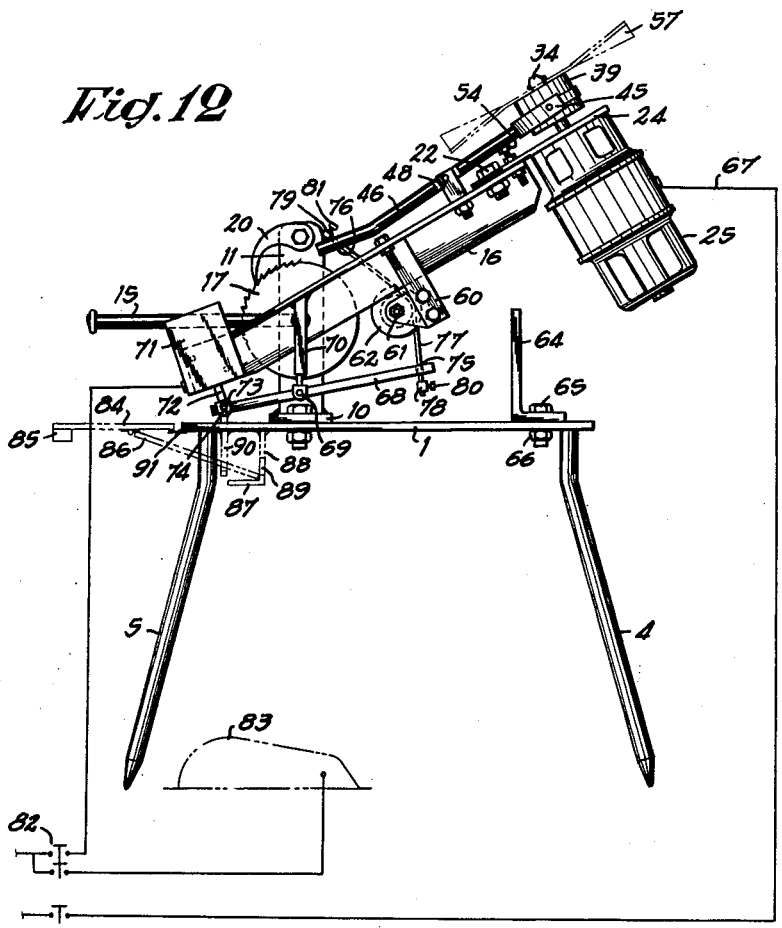
Fig.12
Fig.13
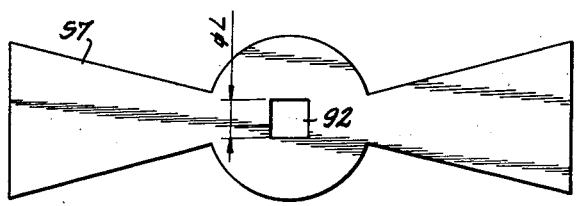
INVENTORS
C. D. de Lossy
H. Moinil
F. Moinil
BY Watson, Cole, Grindle + Watson
Attys.

United States Patent Office 3,130,717
Patented Apr. 28, 1964

3,130,717
ELECTRICAL APPARATUS FOR THROWING FLYING TARGETS USED IN SHOOTING TRAINING AND MATCHES
Chevalier David de Lossy, Chateau de et à Flawinne, Belgium, and Hippolyte Moinil, Chaussee de Waterloo 266, and Fernand Moinil, Chemin de Berlacomine 14, both of Saint-Servais, Belgium
Filed Mar. 2, 1961, Ser. No. 92,946
Claims priority, application Belgium Jan. 23, 1961
5 Claims. (Cl. 124—1)

This invention relates to a very simplified and very efficient apparatus for throwing rapidly flying targets, particularly used in shooting training and matches.

It is well known that the starting conditions, the accelerations and the trajectory of the target are most important for a good shooter and to adapt this experience to the numerous varying conditions to the shooting of living targets.

The apparatus of the invention not only meets all these conditions, but it also has the advantage of being very simple and particularly acceptable to be set rapidly in its throwing condition and, if desired, with accelerations.

In the mechanical apparatus for instance, the operator has to tighten previously the propelling mechanism. Although this operation is simple and less tiring, it may appear in some cases to be relatively slow and the successive throwings may be considered as insufficiently rapid to maintain a sufficient constant activity during a training or a match.

The apparatus of the invention is essentially characterized by the combination of a support, an angularly movable arm, a means for wedging the said arm in any suitable angular position and, at the end of the said arm, an axis which may be rotated very rapidly by an electrical motor, the said axis being provided to receive and temporarily retain the flying target and finally to release the said target.

As known, the support may consist of a table generally mounted on four legs, which may be driven in the ground. The angularly movable arm is mounted loosely on an axle leaning on a post integral with the said table.

The means for wedging the said arm in a suitable angular position consists substantially of a ratchet wheel integral with the said arm and which may be wedged on the said post by an appropriate tightening means and a pawl or rave hook mounted loosely on an axis leaning also on the said post.

The propelling axis of the flying target consists preferably of an extension of the axis of the rotor of a high speed electrical motor, the frame of which is fixed near the end of the said angularly movable arm. This axis has a polygonal head generally squared and provided with a transverse passage, in which two balls are housed, said balls being actuated remote from each other by an intermediate spring abutting against shoulders at the outlets of the said transverse passage to project slightly on the adjoining faces of the said head.

The device releasing the flying target consists substantially of a ring surrounding the lower cylindrical portion of the said head, said ring having a peripheral groove, in which are engaged the two diametrally facing prongs of a fork, the rod of which may switch about an intermediate pin and the free end of which is used for fastening the cable or the rope, with which the apparatus is actuated for throwing the flying target.

The apparatus still comprises different characteristics and more particularly very simple means for adapting the movements of the means releasing the flying target and other arrangements allowing the realization of a particular construction.

All these characteristics will appear more clearly from the following detailed description of a preferred embodiment, which is in no way limiting the applications and the realizations of the invention. This apparatus is represented in the enclosed drawings in which:

FIGURE 1 is a side view of the apparatus of the invention in the repose position;

FIGURE 2 is a plan view thereof;

FIGURE 3 is a view similar to FIGURE 1, the apparatus being shown in the throwing position;

FIGURES 4 and 5 are sectional views on the lines IV—IV and V—V of FIGURE 3 respectively;

FIGURES 6 and 7 are sectional views on the lines VI—VI and VII—VII of FIGURE 5, respectively;

FIGURE 10 is a sectional view on the line X—X of FIGURE 9;

FIGURE 12 is a front view of an embodiment with a magnetic actuating mechanism and the presignalling of the target throwing;

FIGURE 13 is an example of the flying target, which may be used for the apparatus of the invention.

Figure 9:
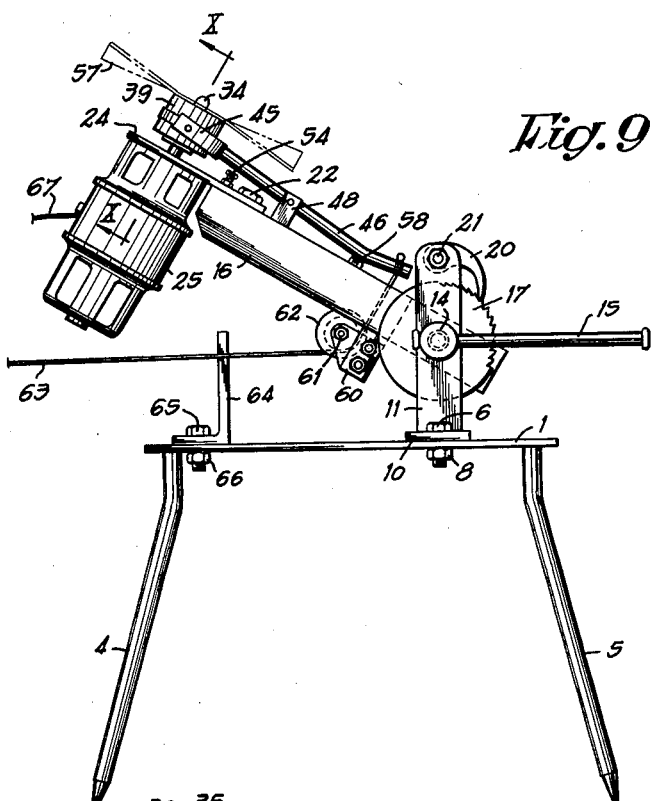
FIGURE 9 is a view similar to FIGURE 3 in the very throwing position.
Figure 11:
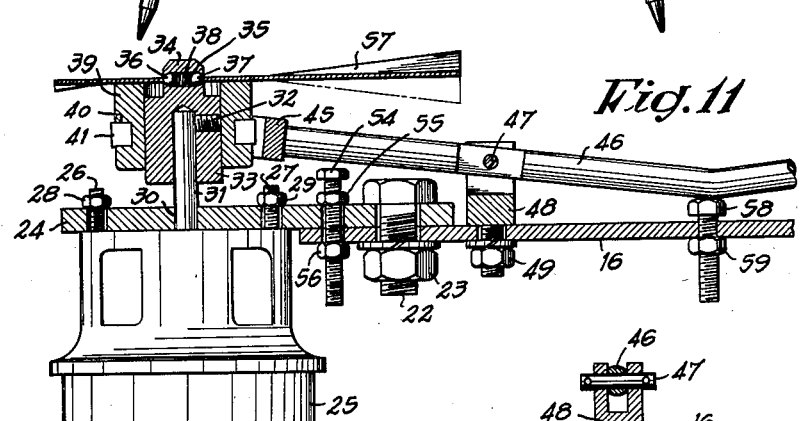
FIGURE 11 is a sectional view on the line XI—XI of FIGURE 10.
Figure 8:
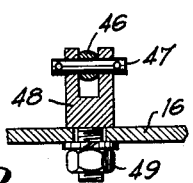
FIGURE 8 is a sectional view on the line VIII—VIII of FIGURE 6.

In this embodiment, the apparatus comprises substantially a table 1 generally made of a thick sheet, mounted on four legs 2—3—4—5, which may be partially or completely driven in the ground. On the table 1, bolts 6—7 and nuts 8—9 are securing the base 10 of a post 11 having, nearly at the half of its height, a hole 12 for passing a bolt 13, the nut 14 of which is diametrally traversed by a lever 15. In addition, the apparatus comprises an arm 16 formed by an angle-iron; to one end of which is welded a ratchet wheel 17, or, as represented in the enclosed drawings, a disc on the periphery of which are cut spaced teeth similar to those of a ratchet wheel. The said bolt 13 traverses the center of the said ratchet wheel or disc 17 and the corresponding portion of the arm 16. Above the said ratchet wheel 17, the said post 11 is traversed by a bolt 18 having a smooth portion 19, which forms the pin of a pawl or rave hook 20, the bolt 18 being secured in its correct position by nut 21. The said pawl or hook 20 falls normally through its own weight on the said ratchet wheel 17, into which it is continuously geared. At the free end of the arm 16, the bolt 22 and the nut 23 are securing a small plate 24, on which is fixed the motor 25 through threaded rods 26—27 and nuts 28—29. This plate 24 is provided with a hole 30 traversed by the axle 31; which is formed by the extension of the axis of the rotor of the said motor 25. On said axle 31, there is wedged, by means of a tightening screw 32, a head 33 having a cylindrical body, the upper portion of which is extended by a square end 34, the size of which is lower than the diameter of the said cylindrical body. The square end 34 has a diametral passage 35, into which the balls 36—37 and an intermediate spring 38 are engaged. The said balls are abutting against the shoulders provided at the outlet of the said diametral passage 35, so that they project slightly from each side of the said square end, as more particularly represented in FIGURE 6. On the cylindrical body of the head 33, there is free fitted a ring 39, the height of which is substantially the same as that of the said cylindrical body. This ring has an annular groove 40, into which are free fitted two half rings 41—42, a pin being threaded in the middle of each said half rings, in 43—44 respectively. The latter are engaged in both free ends of a fork 45, the rod of which 46 extends along the said arm 16 and is mounted on a pin 47 leaning in the upper portion of a small fork 48 threaded in the table 1, with which it is made integral with a nut 49. Both free ends of the said fork 45 have notches 50—51 respectively, into which are engaged the said pins 43—44 respectively. The latter are prevented from being released accidentally from the said notches, due to the cotter pins 52—53, respectively. When the apparatus is in the re-pose position, the rod 46 leans forward on an adjustable stop 54 threaded both in the motor supporting plate 24 and the underlying portion of the arm 16. Said stop 54 consists of a screw, which may be secured in any suitable position by means of nuts 55—56. The position of the said adjustable stop 54 defines the exact position of the ring 39 with respect to the stop balls 36—37 and this relative position is determined by the thickness of the flying target 57 to be used. On the other side of the pin 47 of the rod 46, there is provided a second adjustable stop 58, which may be secured in the correct position by the nut 59. This second adjustable stop 58 defines the angular movement of the rod 56, and thus the linear upwards movement of the ring 39. The movement of the flying target 57 is thereby adjusted to bring it from the stop position to the release position by means of balls 36—37. Under the arm 16, perpendicularly to the free end of the said rod 46, there is fixed a gusset 60 supporting the axis 61 of a pulley 62. The actuating cable or rope 63 of the apparatus is secured to the free end of the said rod 46, passes on the said pulley 62 and is unwound to reach the safety location of the operator appointed to the throwing of the flying targets. Finally, the bolt 65 and the nut 66 are securing a crutch 64 to the table 1. The arm 16 leans on said crutch during its repose position, when the apparatus is not used.

To put the apparatus in the throwing position, the arm 16 must be only brought in the desired angular position, as represented in FIGURES 3 and 6. For this purpose, it is only sufficient to unscrew nut 14 by appropriately actuating the lever 15, the arm 16 being then brought into the appropriate position and the said nut 14 being screwed again. It will be noted that during all this operation, the rave hook 20 is kept engaged into the ratchet wheel 17, thereby preventing any undue fall of the arm and the members it supports.

The adjustable stop 54—56 is adjusted according to the thickness of the central portion of the flying target 57, which is disposed on the square end 34. For this purpose, the said flying target has a central hole, having such shape and sizes that it may be fixed by a simple thrust on the said square head 34. The cable or rope 63 is unwound up to the location intended for the operator, together with the electric cable 67 necessary for energizing the electric motor 25. At this point, the operator closes firstly the feeding circuit of the electric motor by actuating the switch (not represented), supported by the said electric cable 67. The motor rotating rapidly imparts the same movement to the target 57. Under the command of the shooting manager, the operator tightens slightly the rope or cable 63, thereby tilting slightly the rod 46 about the pin 47 and thrusting the central portion of the target 57 through the ring 39. When the target reaches approximately the plane passing through the center of the stop balls 36—37, it is released and propelled violently. There is observed a rapid start, unexpected accelerations and trajectory, all things contributing to provide an imitation as true as possible of the start of a good race shooting pigeon.

It will be observed that the operator has only to provide a new target, which is substantially instantaneous, and to repeat both successive operations for closing the circuit of the motor 25 and tightening the cable or rope 63 etc., said operation being repeatable at a substantially rapid rhythm, particularly when compared with the known mechanical apparatus used for the same purpose.

In the above described embodiment, the throwing of the flying target is induced by tightening a cable or a rope. In some cases, it may appear that the apparatus must operate more instantaneously. In addition the necessity of tightening the rope or the cable and also the fact that this thread-like element has often some longitudinal resilience may be seen as being detrimental. For this purpose, there may be used a magnetic means, an embodiment of which is represented in FIGURE 12. In this embodiment, the main members described in the preceding embodiment are met again, the same references being used for the same members. However, the gusset 60 has been reversed, so that the pulley 62 rotating about the axis 61 be in some manner directed to the front of the apparatus.

Under the said pulley, there is disposed beam 68 mounted about an axis 69, secured to the end of a rod 70, the upper end of which is welded to the upper portion of the arm 16. To the front end of the said arm 16, there is fixed an electro-magnet 71, e.g. of the moving core type. At its free end, the moving core 72 is provided with a head 73, which is linked, through a pin 74, to the corresponding end of the said beam 68. The other end of said beam is traversed by a diametral hole 75 and the free end of the actuating rod 46 is traversed by a diametral hole 76. A semi-rigid cable portion 77 bears on the pulley 62 and one of its ends passes through the hole 75 of the beam 68, the other end passing through the hole 76 of the actuating rod 46. Either projecting end of the said cable 77 have deadheads 78—79 respectively, fixed and adjustable on the said cable by tightening screws 80—81 respectively.

To provide the drive with a certain clearance or tolerance, when one of the said deadheads 79, is contacting the adjoining member traversed by the cable 77, the other deadhead is slightly spaced from the adjoining member also traversed by the said cable.

It will be observed that to drive the apparatus, it is only required, when it is in a correct position and when a target 57 is secured, to unwind on an appropriate distance the electric cables 67 for feeding the motors 25 and 82 for energizing the electro-magnet 71, respectively. The electric motor is firstly driven, thereby rotating rapidily the target, then, under the command of the shooting manager, the control switch of the feeding circuit of the electro-magnet 71 is actuated. When energized, the latter induces the rapid return of its core 72, thereby causing a connection with the beam 68, which, when turning about its axis 69, actuates substantially instantaneously the actuating rod 46 via the deadhead 78, the cable 77 and the second deadhead 79. The energizing ceasing substantially instantaneously, the apparatus is very rapidly replaced in its initial position, the core 72 falling again in its starting position.

The feeding circuit of the electro-magnet 71 may be used for energizing a light signal consisting, under the circumstances, of a lamp 83 disposed near or on the apparatus. For this purpose, a single switch with two successive positions may be advantageously provided. The first position controls the closing of the circuit of the signal lamp 83 and the second position, very near the first, controls the closing of the energizing circuit of the electro-magnet 71. In the same time or instead of the light signal, the apparatus may be provided with a signal, which is a relatively true imitation of that formed by the trap releasing a pigeon.

As represented in FIGURE 12, a trap 84, eventually provided with an appropriate weight 85 ensuring a rapid closure thereof, may be controlled by the same electro-magnet 71. Under the circumstances, a mechanism actuating or releasing said trap is represented as a rod 86 supported by a stop 87, integral with a wall 88 having an opening 89. This rod 86 is controlled by a strap 90 secured to the head 73 of the core of the electro-magnet, e.g. by means of the said pin 74.

As represented in FIGURE 12, the trap 84 in waiting position is supported horizontally by leaning on the hinge 91 through the said rod 86 abutting against the stop 87.

When the electro-magnet 71 is energized, the first axial movement of its core 72, induces a traction on the free end of the said rod 86, which is then brought before the port 89 and released, thereby inducing the immediate falling of the trap 84.

The trap 84 is an accessory device but which, in certain cases, is required by the organizers of competitive shooting matches using simulated pigeons. This requirement is due to the fact that those shooting at pigeons are, in general, much accustomed to conditioning their reflexes to the fall of the flap closing the basket in which the real pigeons are enclosed.

In the first shooting competitions using simulated pigeons, organized by the applicant who is himself experienced in shooting at real pigeons, marksmen even of great ability have been disconcerted in the conditioning of their reflexes.

It was sufficient to add this trap 84 provided with a counterweight 85, to support it by the rod 86 itself sustained by a stop 87—88 provided with an opening 89, the said rod being capable of actuation by the small strap 90 connected to the pivot 74 in order to obtain the result that the said trap 84, freed from the action of the rod 86 at the time of launching a spiral, will be actuated by the counterweight 85 and therefore impress the marksman in a manner similar to that which conditions his reflexes in shooting at real pigeons.

The FIGURE 13 represents a flying target 57 particularly adapted to the apparatus of the invention and more particularly to the embodiment described and represented by way of example in the other figures. In this particular arrangement, the central portion of the target has a square section opening 92, the side L of which is such that the square end 34 of the apparatus may be introduced and free fitted therein, respectively. As a matter of fact, this opening will be just adapted to the form and the sizes of the right section of the said head 34, which, as above described, may be modified.

Of course, any similar members or any member having a similar function may be substituted for all or part of the members described and represented. More particularly, the electric motor could be secured in any other location than on the end of the angularly varying arm. For instance, the electric motor could be secured on or under the table and, in that case, its axis could be connected with the throwing head by means of a flexible cable or a rigid universal joint. Alternatively, the throwing head could have any other form than that described and in this case, the target should have a suitable shape in its central portion.

As generally as possible, the invention relates to any throwing apparatus, wherein the member carrying and propelling respectively the flying target is rotated by means of an electrical motor and more particularly by directly driving the rotor axis of the said electric motor.

What we claim is:

1. An apparatus for throwing flying targets for training and shooting matches, comprising a member for rotating the target, an electric motor with a rotor axle directly connected to said member for rotating the target, means for releasing the target during the rotation thereof, said releasing means comprising a head which has an extended member and which is secured on said rotor axle, a ring slidably mounted on said head, and a pivotable actuating rod having one end engaged in said ring and the axial movement of which is determined by the oscillation of said actuating rod, and yielding means on the extended member to permit release of the target.

2. An apparatus according to claim 1, in which the head is wedged on the rotor axle of the electric motor and said head comprises a cylindrical body which has an extended square end, the said square end being traversed by a passage said yielding means comprising a central spring in said passage and a ball abutting on both ends of said spring and against peripheral shoulders disposed at the ends of the said passage, the said balls forming the temporary stop of the target.

3. An apparatus according to claim 1, in which a magnetic device with a moving core type electro-magnet is provided so that the rod of the mechanism releasing the flying target is connected with the magnetic device the energizing of which actuates the said releasing mechanism, and in which an angularly varying arm opposite to the electric motor and a moving core type electro-magnet are provided with the electro-magnet secured on the free end of the angularly varying arm, the moving core of the said electro-magnet being linked to the end of a beam with the other end connected through a semi-rigid element to the free end of the rod of the target releasing mechanism, the semi-rigid element connecting one of the ends of the beam to the free end of the releasing mechanism passes through both elements and bears, on its outer ends, to a position which may be adjusted.

4. An apparatus according to claim 1, in which the pivotable rod has a fork with a pair of prongs at one end, and in which the ring is in the form of two half-rings, each of which has a pin engaging one of the prongs of the fork at the end of the actuating rod to swing about an axis through the two pins.

5. An apparatus according to claim 1, in which an angularly varying arm is provided, the electric motor being mounted on one end of said arm, an electromagnet having a moving core and mounted on the other end of the arm, a beam pivoted intermediate its ends on said arm, said moving core being linked to one end of the beam, a semi-rigid element connecting the other end of the beam to the other end of the actuating rod, whereby actuation of said electromagnet will cause release of said target.

References Cited in the file of this patent

UNITED STATES PATENTS

| | | |
|---|---|---|
| 542,377 | Shattuck | July 9, 1895 |
| 1,211,738 | Marty | Jan. 9, 1917 |
| 2,112,611 | Snippen | Mar. 29, 1938 |
| 2,731,767 | Holt | Jan. 24, 1956 |